United States Patent
Yin et al.

(10) Patent No.: US 12,375,824 B2
(45) Date of Patent: Jul. 29, 2025

(54) DYNAMIC VISION SENSOR

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Dean Wang, Taichung (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 122 days.

(21) Appl. No.: 18/519,177

(22) Filed: Nov. 27, 2023

(65) Prior Publication Data

US 2025/0030956 A1 Jan. 23, 2025

(30) Foreign Application Priority Data

Jul. 17, 2023 (TW) ................. 112126564

(51) Int. Cl.
*H04N 25/47* (2023.01)
*H04N 23/667* (2023.01)
*H04N 25/772* (2023.01)
*H04N 25/79* (2023.01)

(52) U.S. Cl.
CPC ........... *H04N 25/47* (2023.01); *H04N 23/667* (2023.01); *H04N 25/772* (2023.01); *H04N 25/79* (2023.01)

(58) Field of Classification Search
CPC .... H04N 25/47; H04N 23/667; H04N 25/772; H04N 25/79; H04N 25/707; H04N 25/77; H04N 25/78
USPC .......................................... 348/294
See application file for complete search history.

(56) References Cited

U.S. PATENT DOCUMENTS

| | | | |
|---|---|---|---|
| 10,764,526 B1* | 9/2020 | Liu | H04N 25/772 |
| 2016/0094796 A1* | 3/2016 | Govil | H04N 25/44 348/295 |
| 2020/0084403 A1* | 3/2020 | Suh | H04N 25/79 |
| 2021/0014435 A1* | 1/2021 | Seo | H04N 25/443 |
| 2021/0152762 A1* | 5/2021 | Sakakibara | H04N 25/47 |
| 2021/0235036 A1* | 7/2021 | Kitano | H10F 39/18 |
| 2021/0409625 A1* | 12/2021 | Zhu | H04N 25/683 |
| 2022/0150433 A1* | 5/2022 | Fu | H04N 23/60 |
| 2023/0052364 A1* | 2/2023 | Noda | H04N 25/50 |
| 2023/0059890 A1* | 2/2023 | Hanada | H04N 25/47 |
| 2023/0388679 A1* | 11/2023 | Yin | H04N 23/951 |
| 2024/0323552 A1* | 9/2024 | Moeys | H04N 25/77 |

* cited by examiner

*Primary Examiner* — Lin Ye
*Assistant Examiner* — Chan T Nguyen

(57) ABSTRACT

A dynamic vision sensor includes a sensor and an image signal processor. The sensor includes a pixel driver, a plurality of pixel groups, a cluster differential ADC, a cluster memory, a sensor data interface, and a controller. Each of the pixel groups includes a plurality of pixels and a floating diffusion node, each of the pixels includes a photodiode and a switch, the switch controls whether the electric charges accumulated in the photodiode are transferred to the floating diffusion node, the switch in each of the pixels is controlled by the pixel driver, and each of the pixels within a single pixel group is coupled to the floating diffusion node. The controller controls the pixel driver, the cluster differential ADC, the cluster memory, and the sensor data interface to switch between a dynamic sensing mode and a 2D image sensing mode.

16 Claims, 12 Drawing Sheets

200

| 2000 | 2004 | 2008 | 2012 | 2100 | 2104 | 2108 | 2112 |
|------|------|------|------|------|------|------|------|
| P    |      | P    |      |      |      |      |      |
| 2001 | 2005 | 2009 | 2013 | 2101 | 2105 | 2109 | 2113 |
| 2002 | 2006 | 2010 | 2014 | 2102 | 2106 | 2110 | 2114 |
| N    |      | N    |      |      |      |      |      |
| 2003 | 2007 | 2011 | 2015 | 2103 | 2107 | 2111 | 2115 |
| 2200 | 2204 | 2208 | 2212 | 2300 | 2304 | 2308 | 2312 |
| 2201 | 2205 | 2209 | 2213 | 2301 | 2305 | 2309 | 2313 |
| 2202 | 2206 | 2210 | 2214 | 2302 | 2306 | 2310 | 2314 |
| 2203 | 2207 | 2211 | 2215 | 2303 | 2307 | 2311 | 2315 |

| 2000c | 2004c | 2008c | 2012c | 2100c | 2104c | 2108c | 2112c |
|-------|-------|-------|-------|-------|-------|-------|-------|
| 2001c | 2005c | 2009c | 2013c | 2101c | 2105c | 2109c | 2113c |
| 2002c | 2006c | 2010c | 2014c | 2102c | 2106c | 2110c | 2114c |
| 2003c | 2007c | 2011c | 2015c | 2103c | 2107c | 2111c | 2115c |
| 2200c | 2204c | 2208c | 2212c | 2300c | 2304c | 2308c | 2312c |
| 2201c | 2205c | 2209c | 2213c | 2301c | 2305c | 2309c | 2313c |
| 2202c | 2206c | 2210c | 2214c | 2302c | 2306c | 2310c | 2314c |
| 2203c | 2207c | 2211c | 2215c | 2303c | 2307c | 2311c | 2315c |

FIG. 2C

DYNAMIC VISION SENSOR

CROSS-REFERENCE TO RELATED APPLICATION

This application claims the priority of Taiwanese patent application No. 112126564, filed on Jul. 17, 2023, which is incorporated herewith by reference.

BACKGROUND OF THE INVENTION

1. Field of the Invention

The present invention relates generally to a dynamic vision sensor, and more particularly, a dynamic vision sensor that may switch between a dynamic sensing mode and a 2D image sensing mode.

2. The Prior Arts

Generally, a well-known dynamic vision sensor (DVS) may only sense dynamic images (such as movement of objects) without the function of static two-dimensional (2D) image sensing. As such, to obtain detailed static 2D images, it is required to install an additional 2D image sensor on a device and switch back and forth between dynamic vision sensing and static 2D image sensing, thereby increasing computation time, hardware cost and size, which are disadvantageous for applications such as vehicle safety.

As such, a dynamic vision sensor with a dynamic sensing mode and a 2D image sensing mode that may effectively switch between the two modes is desired. Further, a dynamic vision sensor switching method between a dynamic sensing mode and a 2D image sensing mode is also desired.

SUMMARY OF THE INVENTION

A primary objective of the present invention is to provide a dynamic vision sensor with a dynamic sensing mode and a 2D image sensing mode and may effectively switch between the two modes. The present invention further includes a dynamic vision sensor switching method, allowing the dynamic vision sensor to switch between the dynamic sensing mode and the 2D image sensing mode.

For achieving the foregoing objectives, the present invention provides a dynamic vision sensor including a sensor and an image signal processor. The sensor includes a pixel driver, a plurality of pixel groups, a cluster differential analog-digital converter (ADC) with a positive input terminal and a negative input terminal, a cluster memory, a sensor data interface (for example, a Mobile Industry Processor Interface, MIPI) and a controller. Each pixel group includes a plurality of pixels and a floating diffusion node, each pixel includes a photodiode and a switch, the switch controls whether electric charges accumulated in the photodiode are sent to the floating diffusion node, the switch in each pixel is controlled by the pixel driver, and all the pixels in the same pixel group are commonly coupled to the floating diffusion node. The image signal processor includes an algorithm. A half of the pixel groups are coupled to the positive input terminal of the cluster differential ADC, and the remaining are coupled to the negative input terminal of the cluster differential ADC. The cluster differential ADC outputs data to the cluster memory, the cluster memory sends the data to the image signal processor through the sensor data interface; and the image signal processor sends a calculation result to the controller after performing calculations to the data with the algorithm. According to the calculation result, the controller controls the pixel driver, the cluster differential ADC, the cluster memory and the sensor data interface to switch between a dynamic sensing mode and a two-dimensional (2D) image sensing mode.

For achieving the foregoing objectives, the present invention provides a dynamic vision sensor switching method between a dynamic sensing mode and a 2D image sensing mode, comprising: operating a dynamic vision sensor in the dynamic sensing mode; in the dynamic sensing mode, determining whether a moving object is detected; if the moving object is detected, switching the dynamic vision sensor to the 2D image sensing mode; and in the 2D image sensing mode, checking details of the object.

Therefore, the advantageous effect of the present invention is in that a single dynamic vision sensor system may have the dynamic sensing mode and the 2D image sensing mode, and thus may save computation time and reduce hardware cost and size.

BRIEF DESCRIPTION OF THE DRAWINGS

The present invention will be apparent to those skilled in the art by reading the following detailed description of a preferred embodiment thereof, with reference to the attached drawings, in which:

FIG. 2A is a schematic diagram of a pixel array of the dynamic vision sensor system according to the present invention;

FIG. 2C is a schematic diagram of a cluster memory array of the dynamic vision sensor system according to the present invention;

DETAILED DESCRIPTION OF THE PREFERRED EMBODIMENT

Figure 1A:
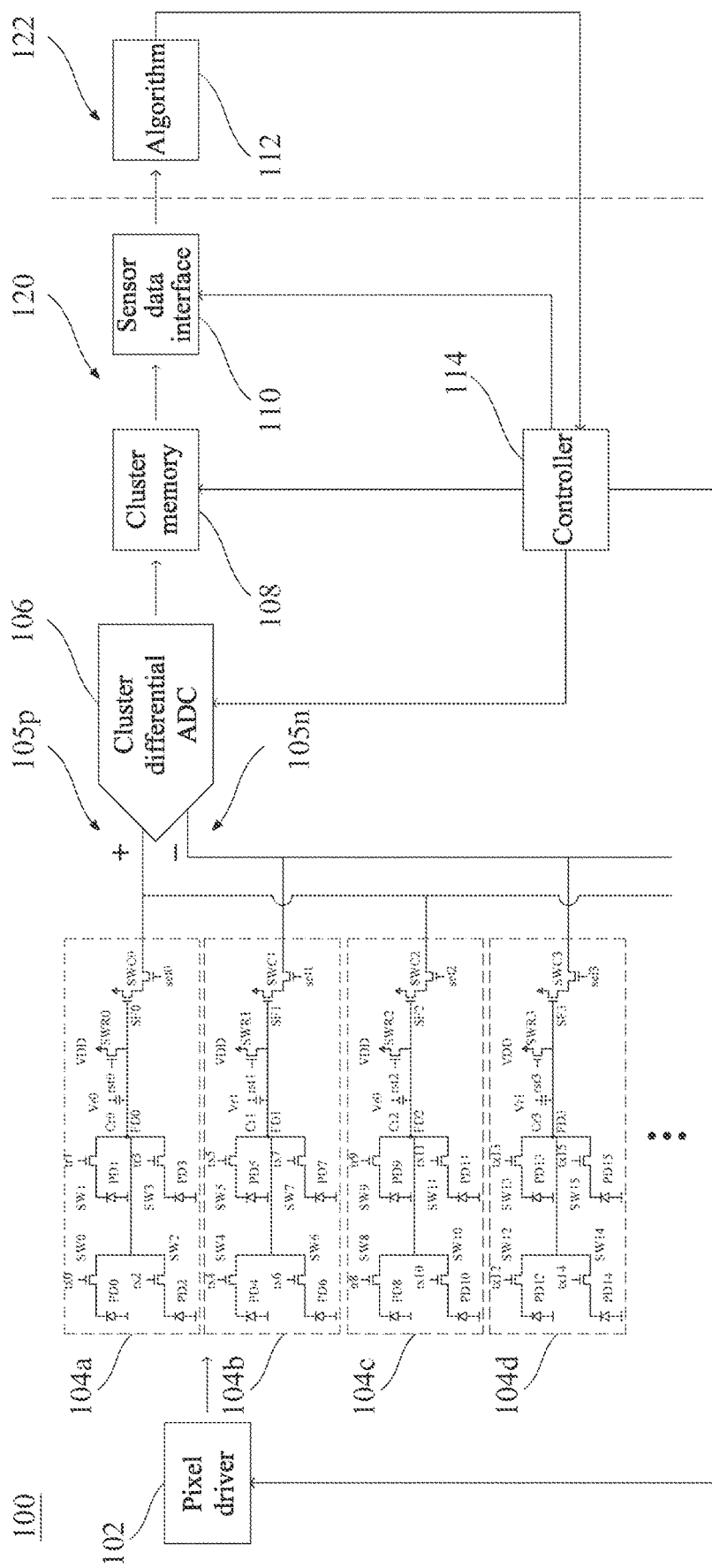
FIGS. 1A and 1B are schematic diagrams illustrating a dynamic vision sensor system according to the present invention.

The accompanying drawings are included to provide a further understanding of the invention and are incorporated in and constitute a part of this specification. The drawings illustrate embodiments of the invention and, together with the description, serve to explain the principles of the invention.

Referring to FIG. 1, an embodiment of the present invention provides a dynamic vision sensor (DVS) 100, including a sensor 120 and an image signal processor 122. The sensor 120 includes a pixel driver 102, a plurality of pixel groups 104a, 104b, 104c, 104d, and so on, a cluster differential analog-digital converter (ADC) 106, a cluster memory 108, a sensor data interface 110 and a controller 114. The image signal processor 122 includes an algorithm 112. Each pixel group includes a plurality of photodiodes, and the photodiodes share a common floating diffusion (FD) node. Each photodiode is associated with a switch (such as an NMOS switch, but not limited thereto), the switch controls whether the electric charges accumulated in the photodiode are sent to the floating diffusion node. A half of the pixel groups are coupled to a positive input terminal 105p of the cluster differential ADC 106, and the remaining are coupled to a negative input terminal 105n of the cluster differential ADC 106. The cluster differential ADC 106 outputs data to the cluster memory 108; and the cluster memory 108 sends the saved data to the image signal processor 122 through the sensor data interface 110. The image signal processor 122 performs computation to the data with the algorithm 112 and sends a result to the controller 114. According to the computation result, the controller 114 controls the pixel driver 102, the cluster differential ADC 106, the cluster memory 108 and the sensor data interface 110 to switch between a dynamic sensing mode and a two-dimensional (2D) image sensing mode.

The numbers of the cluster differential ADC 106, the pixel groups and the photodiodes in each pixel group may be determined according to application requirements. For example, for 16*16 pixels, 16 cluster differential ADCs 106 may be used, each cluster differential ADC 106 has two pixel groups coupled to the positive input terminal 105p and two pixel groups coupled to the negative input terminal 105n, each pixel group has four photodiodes and a floating diffusion node. Taking FIG. 1A as an example, the cluster differential ADC 106 has two pixel groups 104a and 104c coupled to the positive input terminal 105p and two pixel groups 104b and 104d coupled to the negative input terminal 105n. The pixel group 104a has four photodiodes PD0, PD1, PD2 and PD3 controlled by switches SW0, SW1, SW2 and SW3, respectively. The photodiodes PD0, PD1, PD2 and PD3 are commonly coupled to a floating diffusion node FD0, and the floating diffusion node FD0 is coupled to a ramp voltage Vr0 through a capacitor Cr0 and coupled to a supply voltage VDD through a switch SWR0. The floating diffusion node FD0 is coupled to the positive input terminal 105p of the cluster differential ADC 106 through a switch SWC0. A source follower SF0 may exist between the floating diffusion node FD0 and the switch SWC0. The pixel group 104b has four photodiodes PD4, PD5, PD6 and PD7 controlled by switches SW4, SW5, SW6 and SW7, respectively. The photodiodes PD4, PD5, PD6 and PD7 are commonly coupled to a floating diffusion node FD1, and the floating diffusion node FD1 is coupled to a ramp voltage Vr1 through a capacitor Cr1 and coupled to a supply voltage VDD through a switch SWR1. The floating diffusion node FD1 is coupled to the negative input terminal 105n of the cluster differential ADC 106 through a switch SWC1. A source follower SF1 may exist between the floating diffusion node FD1 and the switch SWC1. The pixel group 104c has four photodiodes PD8, PD9, PD10 and PD11 controlled by switches SW8, SW9, SW10 and SW11, respectively. The photodiodes PD8, PD9, PD10 and PD11 are commonly coupled to a floating diffusion node FD2, and the floating diffusion node FD2 is coupled to the ramp voltage Vr0 through a capacitor Cr2 and coupled to a supply voltage VDD through a switch SWR2. The floating diffusion node FD2 is coupled to the positive input terminal 105p of the cluster differential ADC 106 through a switch SWC2. A source follower SF2 may exist between the floating diffusion node FD2 and the switch SWC2. The pixel group 104d has four photodiodes PD12, PD13, PD14 and PD15 controlled by switches SW12, SW13, SW14 and SW15, respectively. The photodiodes PD12, PD13, PD14 and PD15 are commonly coupled to a floating diffusion node FD3, and the floating diffusion node FD3 is coupled to the ramp voltage Vr1 through a capacitor Cr3 and coupled to a supply voltage VDD through a switch SWR3. The floating diffusion node FD3 is coupled to the negative input terminal 105n of the cluster differential ADC 106 through a switch SWC3. A source follower SF3 may exist between the floating diffusion node FD3 and the switch SWC3. That is, the floating diffusion nodes FD0 and FD2 of the pixel groups 104a and 104c coupled to the positive input terminal 105p are coupled to the ramp voltage Vr0 through the capacitors Cr0 and Cr2, and the floating diffusion nodes FD1 and FD3 of the pixel groups 104b and 104d coupled to the negative input terminal 105n are coupled to the ramp voltage Vr1 through the capacitors Cr1 and Cr3.

Figure 1B:
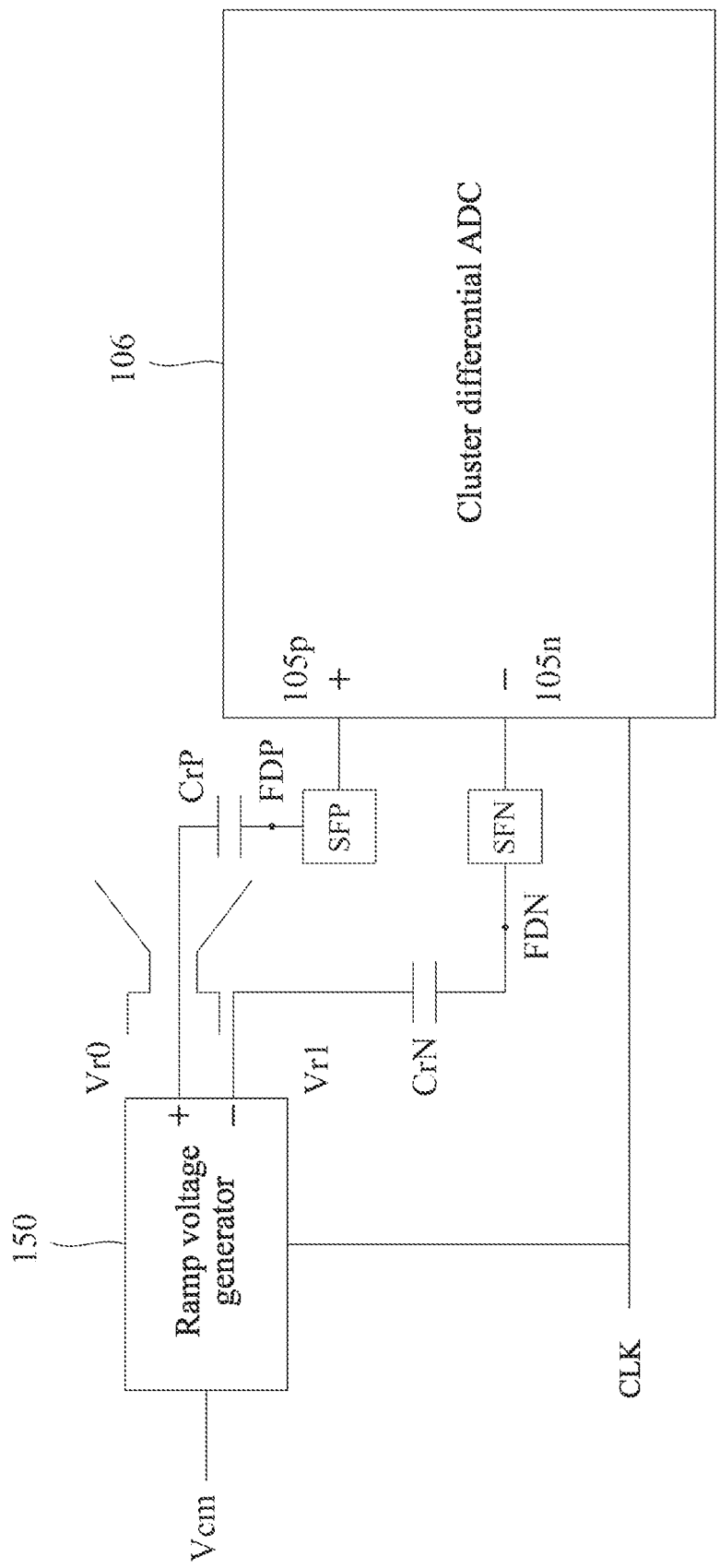

Referring to FIG. 1B, the ramp voltages Vr0 and Vr1 of FIG. 1A are generated by a ramp voltage generator 150, in which Vcm is a common-mode voltage and CLK is a clock. The ramp voltages Vr0 and Vr1 form a ramp voltage pair with one increasing and another decreasing, the directions of which may alter when reading the positive input terminal 105p and the negative input terminal 105n, for example, but not limited to, Vr0 increasing and Vr1 decreasing when reading the positive input terminal 105p, while Vr0 decreasing and Vr1 increasing when reading the negative input terminal 105n. The ramp voltage Vr0 is coupled to a floating diffusion node FDP (such as the floating diffusion nodes FD0 and FD2 in FIG. 1A) at the side of the positive input terminal 105p through a capacitor CrP (such as the capacitors Cr0 and Cr2 in FIG. 1A), while the ramp voltage Vr1 is coupled to a floating diffusion node FDN (such as the floating diffusion nodes FD1 and FD3 in FIG. 1A) at the side of the negative input terminal 105n through a capacitor CrN (such as the capacitors Cr1 and Cr3 in FIG. 1A). The floating diffusion node FDP is coupled to the positive input terminal 105p of the cluster differential ADC 106, while the floating diffusion node FDN is coupled to the negative input terminal 105n of the cluster differential ADC 106. A source follower SFP may exist between the floating diffusion node FDP and the positive input terminal 105p, and a source follower SFN may exist between the floating diffusion node FDN and the negative input terminal 105n.

In the pixel group 104a, a control signal tx0 controls the switch SW0, a control signal tx1 controls the switch SW1, a control signal tx2 controls the switch SW2, and a control signal tx3 controls the switch SW3. A reset signal rst0 controls the switch SWR0, and a selection signal sel0 controls the switch SWC0. In the pixel group 104b, a control signal tx4 controls the switch SW4, a control signal tx5 controls the switch SW5, a control signal tx6 controls the switch SW6, and a control signal tx7 controls the switch SW7. A reset signal rst1 controls the switch SWR1, and a selection signal sel1 controls the switch SWC1. In the pixel group 104c, a control signal tx8 controls the switch SW8, a control signal tx9 controls the switch SW9, a control signal tx10 controls the switch SW10, and a control signal tx11 controls the switch SW11. A reset signal rst2 controls the switch SWR2, and a selection signal sel2 controls the switch SWC2. In the pixel group 104d, a control signal tx12 controls the switch SW12, a control signal tx13 controls the switch SW13, a control signal tx14 controls the switch SW14, and a control signal tx15 controls the switch SW15. A reset signal rst3 controls the switch SWR3, and a selection signal sel3 controls the switch SWC3. According to the commands of the controller 114, the pixel driver 102 controls the aforementioned switches through the control signals tx0~tx15, the reset signals rst0~rst3 and the selection signals sel0~sel3, and further controls the operation of the pixel groups 104a~104d.

Same number of pixels may be implemented with different arrangements. For example, for 16*16 pixels, in addition to the aforementioned arrangement, the arrangement with 32 cluster differential ADCs 106 may be used as well, in which each cluster differential ADC 106 has two pixel groups coupled to the positive input terminal 105p and two pixel groups coupled to the negative input terminal 105n, and each pixel group has two photodiodes and a floating diffusion node. The structure of such an arrangement may be derived from the embodiment shown in FIGS. 1A and 1s thus omitted herein.

Referring to FIG. 2A, in an embodiment, a dynamic vision sensor 200 has 8*8 pixels. The pixels in the dynamic vision sensor 200 may be divided into four pixel subsets. A first pixel subset includes pixels 2000, 2001, 2002, . . . , 2015, which are the 4*4 pixels at the upper left side. A second pixel subset includes pixels 2100, 2101, 2102, . . . , 2115, which are the 4*4 pixels at the upper right side. A third pixel subset includes pixels 2200, 2201, 2202, . . . , 2215, which are the 4*4 pixels at the lower left side. A fourth subset includes pixels 2300, 2301, 2302, . . . , 2315, which are the 4*4 pixels at the lower right side.

Figure 2B:
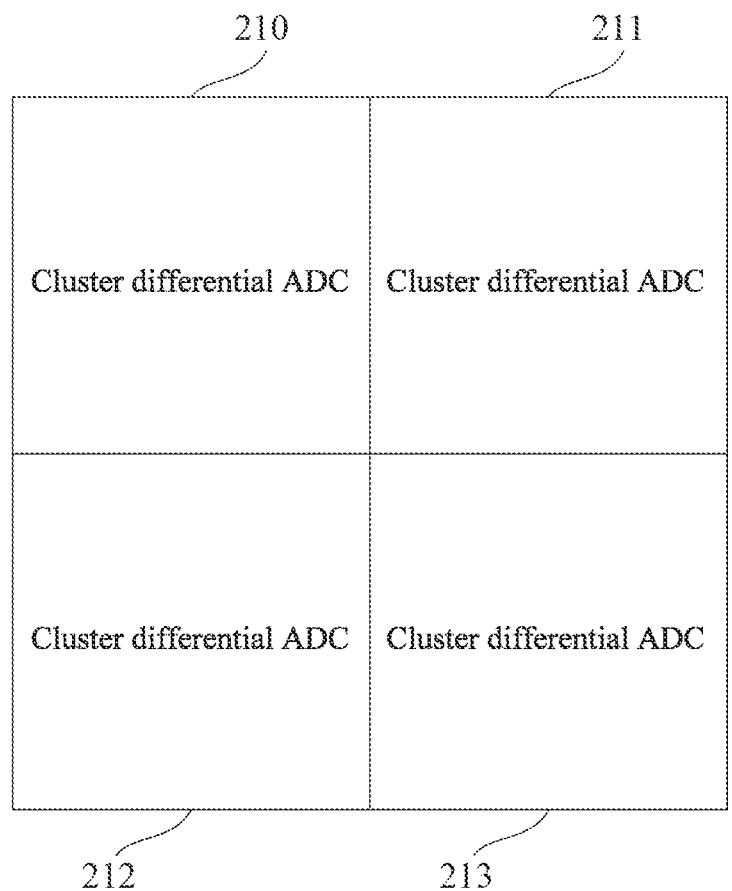
FIG. 2B is a schematic diagram of a cluster differential ADC array of the dynamic vision sensor system according to the present invention.

Referring to FIG. 2B, the four pixel subsets shown in FIG. 2A are respectively coupled to four cluster differential ADCs with a circuit layout similar to that shown in FIG. 1A. The pixels in the first pixel subset are coupled to a cluster differential ADC 210, the pixels in the second pixel subset are coupled to a cluster differential ADC 211, the pixels in the third pixel subset are coupled to a cluster differential ADC 212, and the pixels in the fourth pixel subset are coupled to a cluster differential ADC 213.

Referring to FIG. 2C, the output data of the four cluster differential ADCs shown in FIG. 2B are respectively stored in cluster memories 2000c~2315c, in which the output data of the cluster differential ADC 210 is stored in the cluster memories 2000c, 2001c, 2002c, . . . , 2015c, which are the 4*4 cluster memories at the upper left side. The output data of the cluster differential ADC 211 is stored in the cluster memories 2100c, 2101c, 2102c, . . . , 2115c, which are the 4*4 cluster memories at the upper right side. The output data of the cluster differential ADC 212 is stored in the cluster memories 2200c, 2201c, 2202c, . . . , 2215c, which are the 4*4 cluster memories at the lower left side. The output data of the cluster differential ADC 213 is stored in the cluster memories 2300c, 2301c, 2302c, . . . , 2315c, which are the 4*4 cluster memories at the lower right side. The circuits of the cluster memories may be combined in the circuits of the pixel groups to reduce the chip size used and increase the usage efficiency of chip size or may be combined in the cluster differential ADC circuits, which is beneficial to reducing the signal latency, advantageous in the rapid operation in the dynamic sensing mode and may increase the usage efficiency of chip size.

Figure 2D:
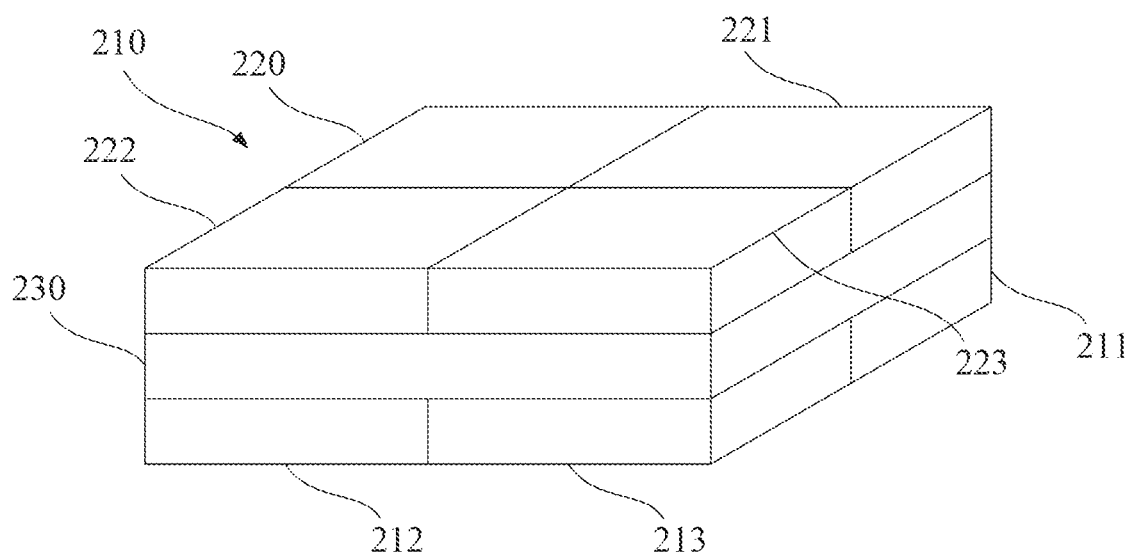
FIGS. 2D, 2E and 2F are schematic diagrams of stack structures of the dynamic vision sensor system according to the present invention.

Referring to FIG. 2D, in an embodiment, the pixel array shown in FIG. 2A and the cluster differential ADC array shown in FIG. 2B may be respectively stacked above and under a substrate 230. To achieve a desirable circuit layout, the pixel subsets and the corresponding cluster differential ADCs may be vertically aligned. For example, a pixel subset 220 (corresponding to the first pixel subset in FIG. 2A) and the corresponding cluster differential ADC 210 lie within the same area in the vertical view, a pixel subset 221 (corresponding to the second pixel subset in FIG. 2A) and the corresponding cluster differential ADC 211 lie within the same area in the vertical view, a pixel subset 222 (corresponding to the third pixel subset in FIG. 2A) and the corresponding cluster differential ADC 212 lie within the same area in the vertical view, and a pixel subset 223 (corresponding to the fourth pixel subset in FIG. 2A) and the corresponding cluster differential ADC 213 lie within the same area in the vertical view. Such an approach may reduce the settling time of analog signals, significantly increase circuit operation performance and thus be advantageous in the rapid operation in the dynamic sensing mode.

Figure 2E:
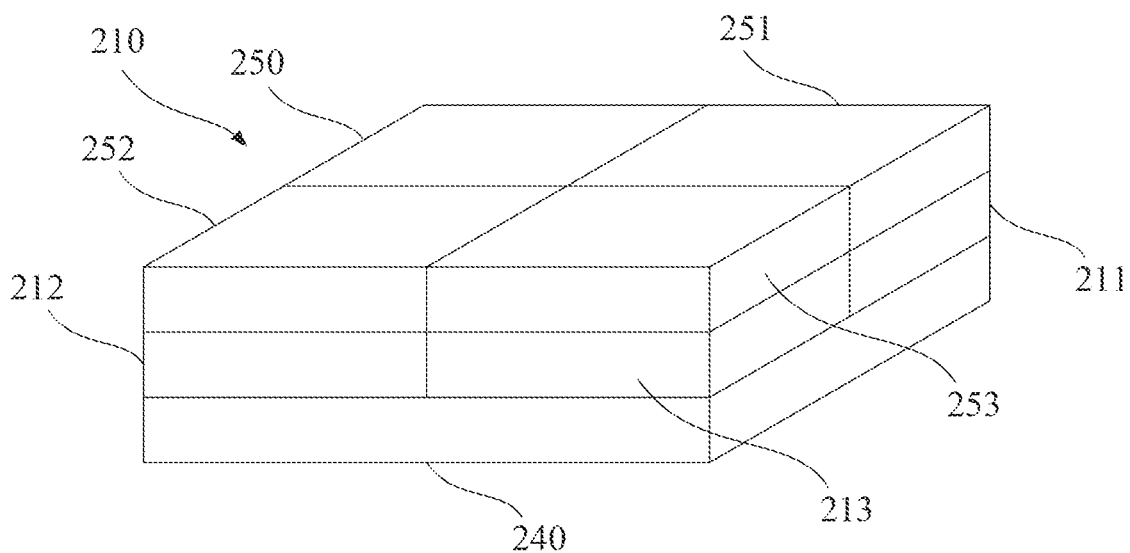

Referring to FIG. 2E, in another embodiment, the pixel array shown in FIG. 2A and the cluster differential ADC array shown in FIG. 2B may be stacked in different layers at the same side of a substrate 240, in which the pixel array may be above or under the cluster differential ADC array. The example shown herein is for the "above". To achieve a desirable circuit layout, the pixel subsets and the corresponding cluster differential ADCs may be vertically aligned. For example, a pixel subset 250 (corresponding to the first pixel subset in FIG. 2A) and the corresponding cluster differential ADC 210 lie within the same area in the vertical view, a pixel subset 251 (corresponding to the second pixel subset in FIG. 2A) and the corresponding cluster differential ADC 211 lie within the same area in the vertical view, a pixel subset 252 (corresponding to the third pixel subset in FIG. 2A) and the corresponding cluster differential ADC 212 lie within the same area in the vertical view, and a pixel subset 253 (corresponding to the fourth pixel subset in FIG. 2A) and the corresponding cluster differential ADC 213 lie within the same area in the vertical view. Such an approach may reduce the settling time of analog signals, significantly increase circuit operation performance and thus be advantageous in the rapid operation in the dynamic sensing mode.

Figure 2F:
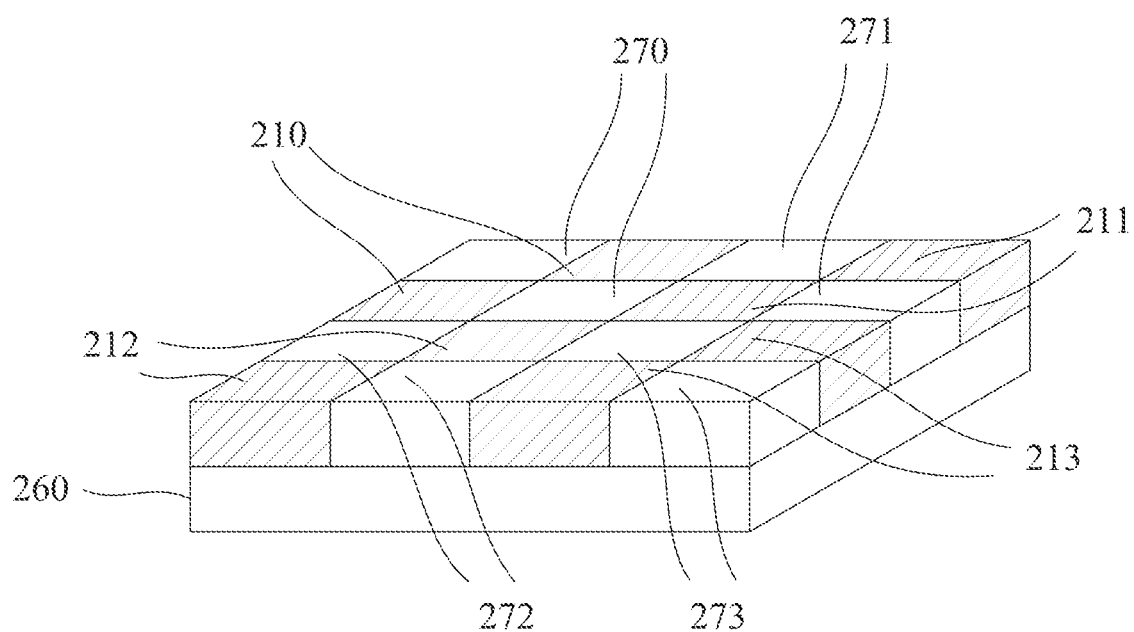

Referring to FIG. 2F, in another embodiment, the pixel array shown in FIG. 2A and the cluster differential ADC array shown in FIG. 2B may be set at the same side of a substrate 260 and use the same element layer and metal wire layer. To achieve a desirable circuit layout, the pixel subsets and the corresponding cluster differential ADCs may be alternately aligned within an area. For example, a pixel subset 270 (corresponding to the first pixel subset in FIG. 2A) and the corresponding cluster differential ADC 210 are alternately aligned within an area, a pixel subset 271 (corresponding to the second pixel subset in FIG. 2A) and the corresponding cluster differential ADC 211 are alternately aligned within an area, a pixel subset 272 (corresponding to the third pixel subset in FIG. 2A) and the corresponding cluster differential ADC 212 are alternately aligned within an area, and a pixel subset 273 (corresponding to the fourth pixel subset in FIG. 2A) and the corresponding cluster differential ADC 213 are alternately aligned within an area. Such an approach may reduce the settling time of analog signals, significantly increase circuit operation performance and thus be advantageous in the rapid operation in the dynamic sensing mode.

Referring to FIG. 2A again, in the dynamic sensing mode, when a light emitter (not shown) emits an incident light (such as an infrared light, but not limited thereto), if an object (not shown) lies in front of the dynamic vision sensor 200, the pixels of the dynamic vision sensor 200 may receive the reflective light reflected from the object through photodiodes. In an embodiment, the dynamic vision sensor 200 determines whether the object is moving based on the intensity difference between the received reflective lights of adjacent pixels. In another embodiment, the pixels in a single pixel subset form a pixel sequence with the order of up to bottom and left to right. By calculating the intensity difference between the received reflective lights of two consecutive frames of the same pixel, or calculating the intensity difference between the received reflective lights of two adjacent pixel groups which are respectively coupled to the positive input terminal 105p and the negative input terminal 105n (shown as P and N respectively), it may be determined whether the object is moving. For example, for the first pixel subset, the pixel sequence may be pixels 2000, 2001, 2002, 2003, 2004, 2005, 2006, 2007, 2008, 2009, 2010, 2011, 2012, 2013, 2014 and 2015, in which the pixels 2000, 2001, 2004 and 2005 are commonly coupled to a first floating diffusion node and form a first pixel group, the pixels 2002, 2003, 2006 and 2007 are commonly coupled to a second floating diffusion node and form a second pixel group, the pixels 2008, 2009, 2012 and 2013 are commonly coupled to a third floating diffusion node and form a third pixel group, and the pixels 2010, 2011, 2014 and 2015 are commonly coupled to a fourth floating diffusion node and form a fourth pixel group. The first floating diffusion node and the third floating diffusion node are coupled to the positive input terminal 105p, while the second floating diffusion node and the fourth floating diffusion node are coupled to the negative input terminal 105n. When the object is moving, the intensity of the received reflective lights differ between two consecutive frames of the same pixel, and the intensity of the received reflective lights differ between corresponding pixels of adjacent pixel groups, thereby both causing the difference in the accumulated electric charges in the photodiodes. Thus, the intensity difference between the reflected lights of two consecutive frames of a single pixel in the pixel sequence may be calculated, by converting the voltages of the two frames to digital signals and calculating the difference therebetween, to determine whether the object is moving. Alternatively, two adjacent pixel groups in the pixel sequence which are respectively coupled to the positive input terminal 105p and the negative input terminal 105n may be compared, and the intensity difference between the reflective lights of the pixels at corresponding positions in the two pixel groups may be calculated, by calculating the voltage difference of the corresponding pixels and then converting it to a digital signal, to obtain a relatively good signal-noise ratio (SNR), or alternatively, the voltages of the corresponding pixels may be converted to digital signals for calculating the difference therebetween to obtain the intensity difference of the reflective lights, to determine whether the object is moving. For example, the intensity differences between the reflected lights of the pixels with corresponding positions in the first pixel group (coupled to the positive input terminal 105p) and the second pixel group (coupled to the negative input terminal 105n), for example, between the pixels 2000 and 2002, the pixels 2001 and 2003, the pixels 2004 and 2006 and the pixels 2005 and 2007, may be calculated to determine whether the object is moving.

Optionally, the dynamic vision sensor 100 uses a binning mode, superposing adjacent pixels as a single pixel output signal. Here, the sum of the accumulated electric charges in each pixel of a pixel group in the pixel sequence may be calculated to obtain a total intensity of reflective lights of the pixel group, and then compare the total intensity of two consecutive frames to determine whether the object is moving. For example, for the first pixel group (including the pixels 2000, 2001, 2004 and 2005), the total intensity of reflective lights of the pixels 2000, 2001, 2004 and 2005 may be calculated, and then calculate the difference of the total intensity of reflective lights between two consecutive frames to determine whether the object is moving. Alternatively, the total intensity of reflective lights of each pixel group in the pixel sequence may be calculated, and then compare the total intensity of reflective lights of two adjacent pixel groups respectively coupled to the positive input terminal 105p and the negative input terminal 105n to determine whether the object is moving. For example, for the first pixel group (coupled to the positive input terminal 105p) and the second pixel group (coupled to the negative input terminal 105n), a first total intensity of reflective lights of pixels 2000, 2001, 2004 and 2005 and a second total intensity of reflective lights of pixels 2002, 2003, 2006, 2007 may be calculated, and then the difference between the first total intensity of reflective lights and the second total intensity of reflective lights is calculated to determine whether the object is moving. Such an approach may obtain a relatively good SNR.

As mentioned above, the pixels 2000, 2001, 2004 and 2005 are commonly coupled to the first floating diffusion node to form a first pixel group, the pixels 2002, 2003, 2006 and 2007 are commonly coupled to the second floating diffusion node to form a second pixel group, the pixels 2008, 2009, 2012 and 2013 are commonly coupled to the third floating diffusion node to form a third pixel group, and the pixels 2010, 2011, 2014 and 2015 are commonly coupled to the fourth floating diffusion node to form a fourth pixel group. The first floating diffusion node and the third floating diffusion node are coupled to the positive input terminal 105p, while the second floating diffusion node and the fourth floating diffusion node are coupled to the negative input terminal 105n. For example, for the first pixel group, the pixel 2000 may include the photodiode PD0 and the switch SW0 shown in FIG. 1A, the pixel 2001 may include the photodiode PD1 and the switch SW1 shown in FIG. 1A, the pixel 2004 may include the photodiode PD2 and the switch SW2 shown in FIG. 1A, and the pixel 2005 may include the photodiode PD3 and the switch SW3 shown in FIG. 1. Here, the first floating diffusion node may be the floating diffusion node FD0. For the second pixel group, the pixel 2002 may include the photodiode PD4 and the switch SW4 shown in FIG. 1A, the pixel 2003 may include the photodiode PD5 and the switch SW5 shown in FIG. 1A, the pixel 2006 may include the photodiode PD6 and the switch SW6 shown in FIG. 1A, and the pixel 2007 may include the photodiode PD7 and the switch SW7 shown in FIG. 1. Here, the second floating diffusion node may be the floating diffusion node FD1, and so on. When performing the subtracting operation between the pixel 2002 and the pixel 2000, the pixel driver 102 controls the switch SW0 in the pixel 2000 and the switch SW4 in the pixel 2002 to be successively turned on and turns off the switches SW1, SW2, SW3, SW5, SW6, SW7, etc. in the remaining pixels. In this case, the positive input terminal 105p of the cluster differential ADC 106 receives a first signal from the photodiode PD0 in the pixel 2000, the negative input terminal 105n of the cluster differential ADC 106 receives a second signal from the photodiode PD4 in the pixel 2002, and the subtraction operation between the first signal and the second signal is performed, and so forth.

The aforementioned is the operation of the dynamic vision sensor 100 in the dynamic sensing mode. With the circuit structure shown in FIG. 1A, the dynamic vision sensor 100 may also operate in a 2D image sensing mode without extra hardware cost. In the 2D image sensing mode, no subtracting operations are performed between pixels. Rather, all the pixels are read into the memory. Thus, an operation method different from the dynamic sensing mode is required to allow each pixel to be positively read into the cluster memory 108. An exemplary reading method is alternately reading the pixels coupled to the positive input terminal 105*p* and the pixels coupled to the negative input terminal 105*n*. In this example, when the pixels coupled to the positive input terminal 105*p* are read, the pixel driver 102 turns off all the photodiodes coupled to the negative input terminal 105*n*. In this case, the ramp voltage Vr0 at the positive input terminal 105*p* is increasing while the ramp voltage Vr1 at the negative input terminal 105*n* is decreasing. When the pixels coupled to the negative input terminal 105*n* are read, the pixel driver 102 turns off all the photodiodes coupled to the positive input terminal 105*p*. In this case, the ramp voltage Vr0 at the positive input terminal 105*p* is decreasing while the ramp voltage Vr1 at the negative input terminal 105*n* is increasing. The opposite may also apply, in which reading is performed when Vr0 or Vr1 is decreasing and turning off occurs when Vr0 or Vr1 is increasing. As such, all of the pixels coupled to the positive input terminal 105*p* and the pixels coupled to the negative input terminal 105*n* may be read into the cluster memory 108 without mutual interference.

Figure 3:
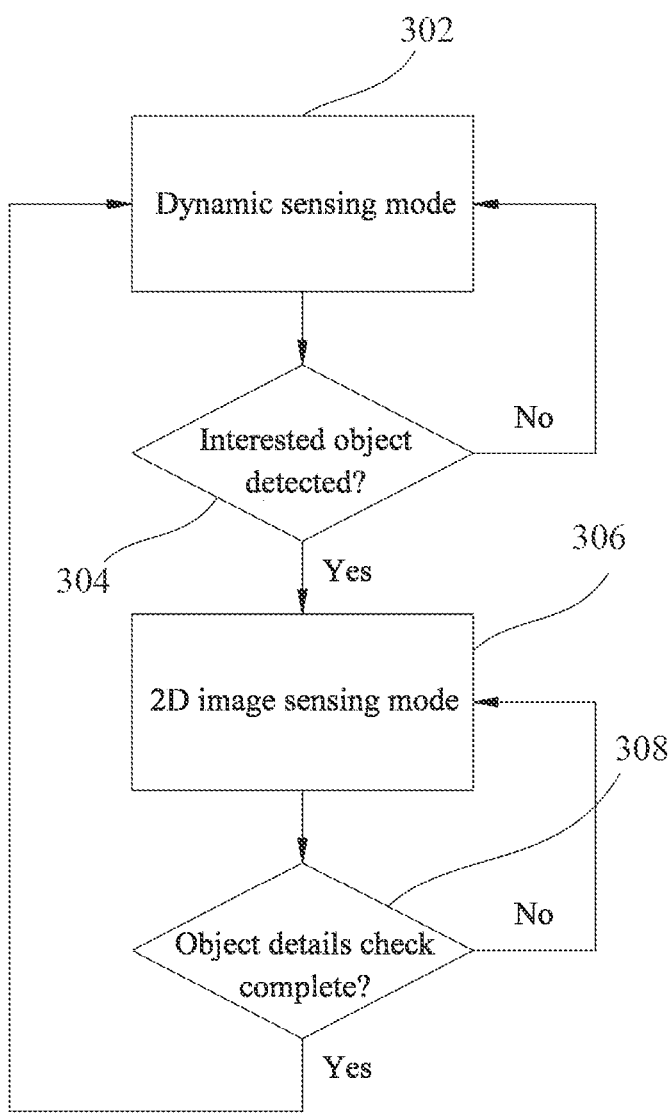
FIG. 3 is a flow chart of a dynamic vision sensor switching method according to the present invention.

Referring to FIG. 3, the present invention includes a method 300, which allows the dynamic vision sensor 100 to switch between a dynamic sensing mode and a 2D image sensing mode. In step 302, the dynamic vision sensor 100 operates in the dynamic sensing mode. In this case, to detect rapidly moving objects, since the frames per second (FPS) of the dynamic vision sensor 100 is relatively high and the image details are relatively few, the binning mode may be optionally used to superimpose adjacent pixels into a single pixel output signal. When object movement is detected, the dynamic vision sensor 100 will switch to the 2D image sensing mode to detect the complete detail of each pixel of the object. In step 304, the dynamic vision sensor 100 determines whether an interested object is detected. Here, the "interested object" refers to a moving object. With the pixel subtracting calculation mentioned above, the image signal processor 122 may determine whether the object is moving. For example, after calculating the difference between two consecutive frames of a single pixel or between the pixels at corresponding positions of two adjacent pixel groups, if the image signal processor 122 determines the movement of the object matches a switching condition of sensing modes, proceed to step 306. If not, go back to step 302. In this embodiment, the switching condition of sensing modes may be determined by the number of pixels with reflective light intensity changes, the moving speed of the object, the moving direction of the object, the size of the object, and so on.

In step 306, the dynamic vision sensor 100 operates in the 2D image sensing mode. In this case, to clearly read the details of the object, since the FPS of the dynamic vision sensor 100 is relatively low and the resolution is relatively high, the binning mode may be optionally used. In step 308, if the dynamic vision sensor 100 has finished the desired detail check (for example, the size, color, type, etc. of the object), go back to step 302 to make the dynamic vision sensor 100 go back to the dynamic sensing mode to detect the next moving object. If not, go back to step 306 to continue reading the details of the object in the 2D image sensing mode.

Figure 4A:
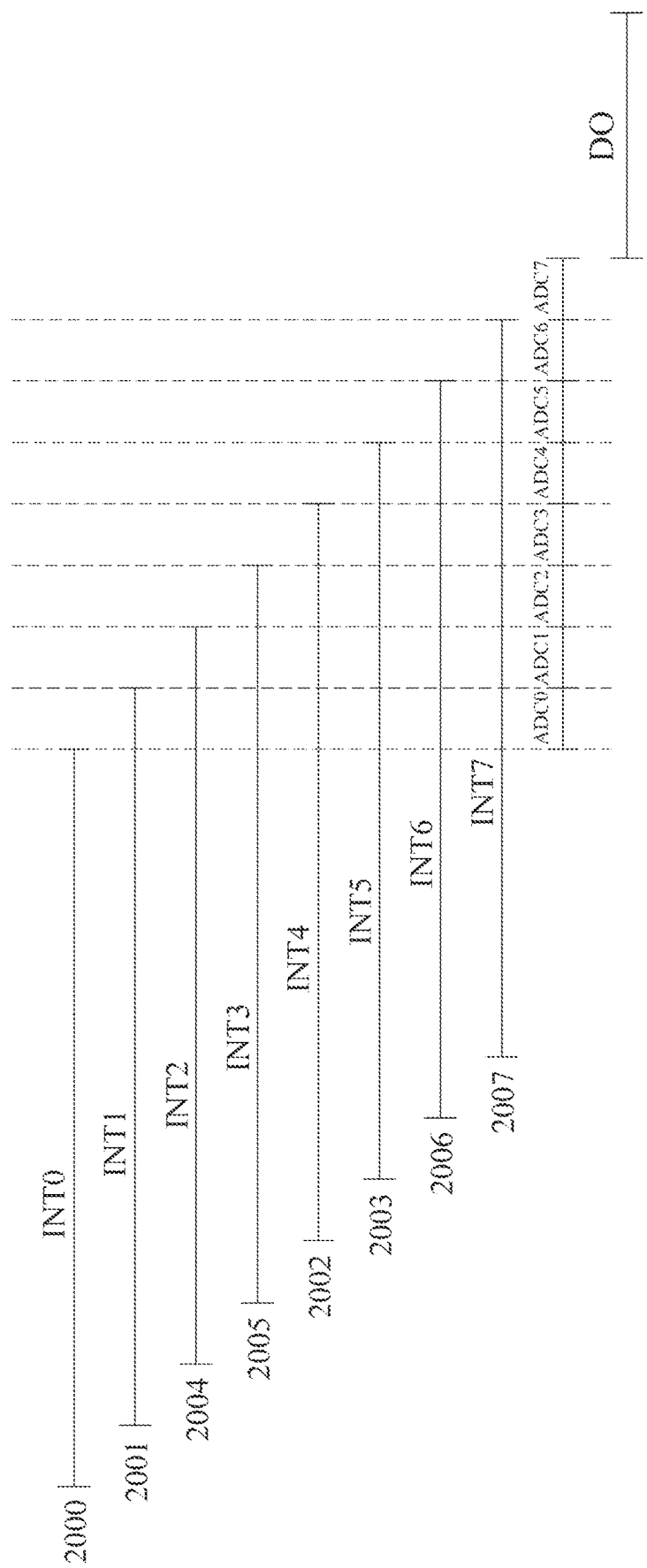
FIGS. 4A, 4B and 5 are exemplary timing diagrams according to the present invention.

When the exposure of a pixel starts, the reset signal (for example, rst0~rst3) and the control signals (for example, tx0~tx15) associated with the pixel are simultaneously asserted to reset the floating diffusion node (for example, FD0~FD3) associated with the pixel and to dump out the electric charges in the photodiode (for example, PD0~PD15) associated with the pixel, and then the reset signal and the control signal are de-asserted. When the exposure of a pixel ends, the reset signal associated with the pixel is asserted to reset the floating diffusion node associated with the pixel, and then the reset signal is de-asserted, the control signal is asserted and then de-asserted to dump out the electric charges in the photodiode associated with the pixel, and the read-out time of the pixel starts. Referring to FIG. 4A, in the 2D image sensing mode, the exposure time of each pixel is relatively high and the FPS is relatively low. Taking the first pixel group (including the pixels 2000, 2001, 2004 and 2005 coupled to the positive input terminal 105*p*) and the second pixel group (including the pixels 2002, 2003, 2006 and 2007 coupled to the negative input terminal 105*n*) as examples, the reset signal rst0 and the floating diffusion node FD0 are associated with the first pixel group, while the reset signal rst1 and the floating diffusion node FD1 are associated with the second pixel group. When a time interval INT0 starts, the reset signal rst0 and the control signal tx0 associated with the pixel 2000 are simultaneously asserted and then de-asserted so that the floating diffusion node FD0 is reset and the electric charges in the photodiode PD0 are dumped out to start the exposure of the pixel 2000. Subsequently, when the time interval INT0 ends, the reset signal rst0 is asserted and then de-asserted so that the floating diffusion node FD0 is reset and the exposure of the pixel 2000 ends. When a time interval ADC0 starts, the control signal tx0 is asserted and then de-asserted so that the electric charges in the photodiode PD0 are dumped out and the pixel 2000 is read out. Here, the signal of the pixel 2000 is input into the cluster differential ADC 106 to perform an analog-digital conversion, and then the converted signal is input into the cluster memory 108. When a time interval INT1 starts, the reset signal rst0 and the control signal tx1 associated with the pixel 2001 are simultaneously asserted and then de-asserted so that the floating diffusion node FD1 is reset and the electric charges in the photodiode PD1 are dumped out to start the exposure of the pixel 2001. Subsequently, when the time interval INT1 ends, the reset signal rst0 is asserted and then de-asserted so that the floating diffusion node FD1 is reset and the exposure of the pixel 2001 ends. When a time interval ADC1 starts, the control signal tx1 is asserted and then de-asserted so that the electric charges in the photodiode PD1 are dumped out and the pixel 2001 is read out. Here, the signal of the pixel 2001 is input into the cluster differential ADC 106 to perform an analog-digital conversion, and then the converted signal is input into the cluster memory 108. Similarly, the pixel 2004 starts exposure at a time interval INT2 and is read out at a time interval ADC2. The pixel 2005 starts exposure at a time interval INT3 and is read out at a time interval ADC3. After all the pixels of the first pixel group are successively exposed, the pixels of the second pixel group start to be successively exposed. When a time interval INT4 starts, the reset signal rst1 and the control signal tx4 associated with the pixel 2002 are simultaneously asserted and then de-asserted so that the floating diffusion node FD4 is reset and the electric charges in the photodiode PD4 are dumped out to start the exposure of the pixel 2002. Subsequently, when the time interval INT4 ends, the reset signal rst1 is asserted and then de-asserted so that the floating diffusion node FD4 is reset and the exposure of the pixel 2002 ends. When a time interval ADC4 starts, the control signal tx4 is asserted and then de-asserted so that the electric charges in the photodiode PD4 are dumped out and the pixel 2002 is read out. Here, the signal of the pixel 2002 is input into the cluster differential ADC 106 to perform an analog-digital conversion, and then the converted signal is input into the cluster memory 108. Similarly, the pixel 2003 starts exposure at a time interval INT5 and is read out at a time interval ADC5. The pixel 2006 starts exposure at a time interval INT6 and is read out at a time interval ADC6. The pixel 2007 starts exposure at a time interval INT7 and is read out at a time interval ADC7. Here, the read-out of all the pixels of the first pixel group and the second pixel group finishes. At a time interval DO, all the converted signals in the cluster memory 108 are input into the image signal processor 122 through the sensor data interface 110 for subsequent calculations.

Figure 4B:
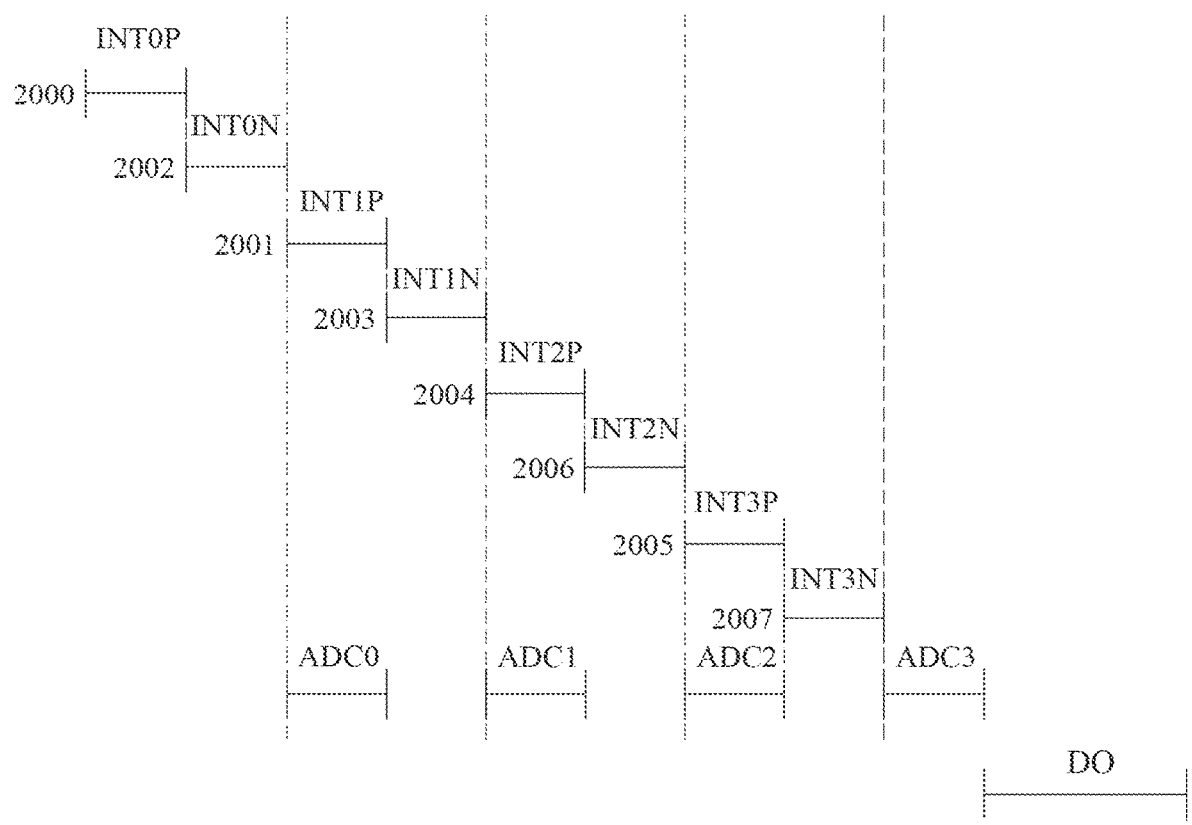

Referring to FIG. 4B, in the dynamic sensing mode, the exposure time of each pixel is relatively short and the FPS is relatively high. Taking the first pixel group (including the pixels 2000, 2001, 2004 and 2005 coupled to the positive input terminal 105p) and the second pixel group (including the pixels 2002, 2003, 2006 and 2007 coupled to the negative input terminal 105n) as examples, the reset signal rst0 and the floating diffusion node FD0 are associated with the first pixel group, while the reset signal rst1 and the floating diffusion node FD1 are associated with the second pixel group. As mentioned above, the intensity difference of reflective lights between pixels at corresponding positions of the first pixel group (coupled to the positive input terminal 105p) and the second pixel group (coupled to the negative input terminal 105n), for example, between the pixels 2000 and 2002, the pixels 2001 and 2003, the pixels 2004 and 2006 and the pixels 2005 and 2007, may be calculated to determine whether the object is moving. When a time interval INT0P starts, the reset signal rst0 and the control signal tx0 associated to the pixel 2000 are simultaneously asserted and then de-asserted so that the floating diffusion node FD0 is reset and the electric charges in the photodiode PD0 are dumped out to start the exposure of the pixel 2000. When the time interval INT0P ends, the reset signal rst0 is asserted and then de-asserted so that the floating diffusion node FD0 is reset and the exposure of the pixel 2000 ends. When a time interval INT0N starts, the reset signal rst1 and the control signal tx4 associated to the pixel 2002 are simultaneously asserted and then de-asserted so that the floating diffusion node FD1 is reset and the electric charges in the photodiode PD4 are dumped out to start the exposure of the pixel 2002. When the time interval INT0N ends, the reset signal rst1 is asserted and then de-asserted so that the floating diffusion node FD1 is reset and the exposure of the pixel 2002 ends. Subsequently, at a time interval ADC0, the control signal tx0 associated with the pixel 2000 and the control signal tx4 associated with the pixel 2002 are simultaneously asserted and then de-asserted so that the pixels 2000 and 2002 are read out. The difference between the signal of the pixel 2000 and the signal of the pixel 2002 are calculated in the cluster differential ADC 106, and then the cluster differential ADC 106 converts the analog signal obtained by the subtraction into a digital signal and inputs the digital signal into the cluster memory 108. Similarly, at a time interval INT1P, the pixel 2001 starts exposure, at a time interval INT1N, the pixel 2003 starts exposure, and at a time interval ADC1, the pixels 2001 and 2003 are read out and the difference therebetween is calculated. At a time interval INT2P, the pixel 2004 starts exposure, at a time interval INT2N, the pixel 2006 starts exposure, and at a time interval ADC2, the pixels 2004 and 2006 are read out and the difference therebetween is calculated. At a time interval INT3P, the pixel 2005 starts exposure, at a time interval INT3N, the pixel 2007 starts exposure, and at a time interval ADC3, the pixels 2005 and 2007 are read out and the difference therebetween is calculated. At a time interval DO, all the converted signals in the cluster memory 108 are input into the image signal processor 122 through the sensor data interface 110 for subsequent calculations.

Figure 5:
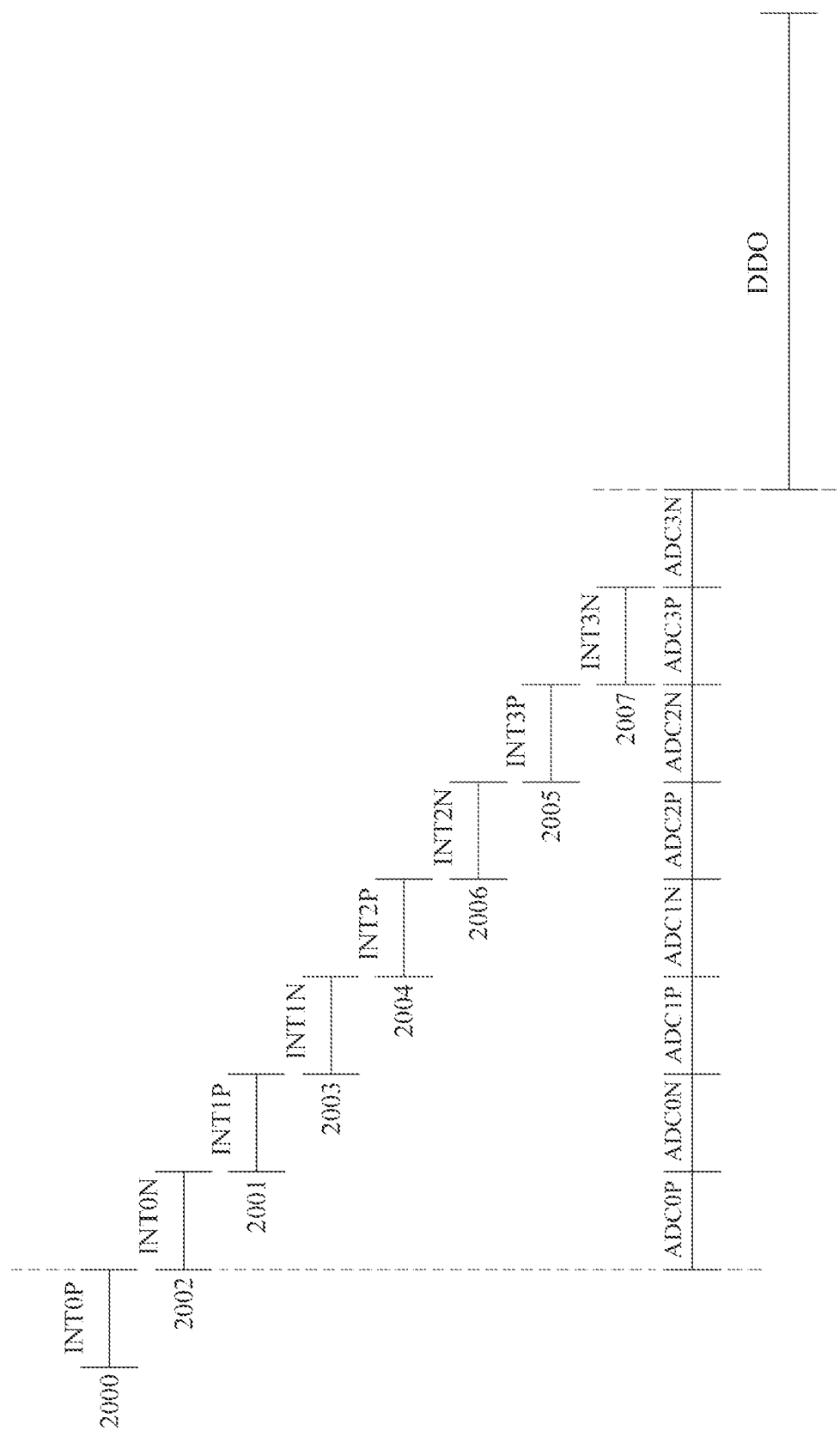

Referring to FIG. 5, in the dynamic sensing mode, an alternative process is first converting the analog signals of each pixel into digital signals and then performing differential operations between the digital signals. When a time interval INT0P starts, the reset signal rst0 and the control signal tx0 associated to the pixel 2000 are simultaneously asserted and then de-asserted so that the floating diffusion node FD0 is reset and the electric charges in the photodiode PD0 are dumped out to start the exposure of the pixel 2000. When the time interval INT0P ends, the reset signal rst0 is asserted and then de-asserted so that the floating diffusion node FD0 is reset and the exposure of the pixel 2000 ends. Subsequently, when a time interval ADC0P starts, the control signal tx0 is asserted and then de-asserted so that the electric charges in the photodiode PD0 are dumped out and the pixel 2000 is read out. The signal of the pixel 2000 is converted into a digital signal in the cluster differential ADC 106, and the digital signal is input into the cluster memory 108. When a time interval INT0N starts, the reset signal rst1 and the control signal tx4 associated to the pixel 2002 are simultaneously asserted and then de-asserted so that the floating diffusion node FD1 is reset and the electric charges in the photodiode PD4 are dumped out to start the exposure of the pixel 2002. When the time interval INT0N ends, the reset signal rst1 is asserted and then de-asserted so that the floating diffusion node FD1 is reset and the exposure of the pixel 2002 ends. Subsequently, when a time interval ADC0N starts, the control signal tx1 is asserted and then de-asserted so that the electric charges in the photodiode PD1 are dumped out and the pixel 2002 is read out. The signal of the pixel 2002 is converted into a digital signal in the cluster differential ADC 106, and the digital signal is input into the cluster memory 108. Similarly, at a time interval INT1P, the pixel 2001 starts exposure, at a time interval ADC1P, the pixel 2001 is read out, at a time interval INT1N, the pixel 2003 starts exposure, and at a time interval ADC1N, the pixel 2003 is read out. At a time interval INT2P, the pixel 2004 starts exposure, at a time interval ADC2P, the pixel 2004 is read out, at a time interval INT2N, the pixel 2006 starts exposure, and at a time interval ADC2N, the pixel 2006 is read out. At a time interval INT3P, the pixel 2005 starts exposure, at a time interval ADC3P, the pixel 2005 is read out, at a time interval INT3N, the pixel 2007 starts exposure, and at a time interval ADC3N, the pixel 2007 is read out. At or before a time interval DDO, the difference between the digital signals obtained at the time intervals ADC0P and ADC0N is calculated (for example, using a digital circuit), the difference between the digital signals obtained at the time intervals ADC1P and ADC01N is calculated, the difference between the digital signals obtained at the time intervals ADC2P and ADC2N is calculated, and the difference between the digital signals obtained at the time intervals ADC3P and ADC3N is calculated, and then the calculated difference values are input into the image signal processor 122 through the sensor data interface 110 for subsequent calculations.

It may be understood from the description above that the present invention may provide a higher operation performance and a more desirable SNR, suitable for the rapid operation in the dynamic sensing mode. The present invention may also be switched to a high-resolution 2D image sensing mode through the control of timing changes. The switching between the two sensing modes may be controlled through a controller with an algorithm.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A dynamic vision sensor, comprising:
a sensor; and
an image signal processor;
wherein the sensor comprises:
a pixel driver;
a plurality of pixel groups, each pixel group including a plurality of pixels and a floating diffusion node, each pixel including a photodiode and a switch, the switch controlling whether electric charges accumulated in the photodiode are sent to the floating diffusion node, the switch in each pixel being controlled by the pixel driver, and all the pixels in the same pixel group are commonly coupled to the floating diffusion node;
a cluster differential analog-digital converter (ADC) with a positive input terminal and a negative input terminal;
a cluster memory;
a sensor data interface; and
a controller,
wherein:
the image signal processor includes an algorithm;
a half of the pixel groups are coupled to the positive input terminal of the cluster differential ADC, and the remaining are coupled to the negative input terminal of the cluster differential ADC;
the cluster differential ADC outputs data to the cluster memory, the cluster memory sends the data to the image signal processor through the sensor data interface, the image signal processor sends a calculation result to the controller after performing calculations to the data with the algorithm; and
according to the calculation result, the controller controls the pixel driver, the cluster differential ADC, the cluster memory and the sensor data interface to switch between a dynamic sensing mode and a two-dimensional (2D) image sensing mode.

2. The dynamic vision sensor according to claim 1, wherein:
each floating diffusion node of the pixel groups coupled to the positive input terminal is coupled to a first ramp voltage through a respective capacitor, and each floating diffusion node of the pixel groups coupled to the negative input terminal is coupled to a second ramp voltage through a respective capacitor; and
the first ramp voltage and the second ramp voltage form a ramp voltage pair with one increasing and another decreasing, directions of the both altering when reading the positive input terminal and the negative input terminal.

3. The dynamic vision sensor according to claim 1, wherein a circuit of the cluster memory is combined in a circuit of the pixel groups.

4. The dynamic vision sensor according to claim 1, wherein a circuit of the cluster memory is combined in a circuit of the cluster differential ADC.

5. The dynamic vision sensor according to claim 1, wherein the pixel groups are stacked with the corresponding cluster differential ADCs.

6. The dynamic vision sensor according to claim 5, wherein the pixel groups and the cluster differential ADCs are stacked at opposite sides of a substrate.

7. The dynamic vision sensor according to claim 5, wherein the pixel groups and the cluster differential ADCs are set at a same side of a substrate and use a same element layer and metal wire layer.

8. The dynamic vision sensor according to claim 5, wherein the pixel groups and the cluster differential ADCs are stacked in different layers at a same side of a substrate.

9. The dynamic vision sensor according to claim 1, wherein in the dynamic sensing mode, the cluster differential ADC uses an intensity difference of reflective lights received from an object between two consecutive frames of a same pixel to determine whether the object is moving.

10. The dynamic vision sensor according to claim 1, wherein:
in the dynamic sensing mode, the pixels form a pixel sequence with the order of up to bottom and left to right, the pixel sequence includes a first pixel group and a second pixel group that are adjacent to each other, the first pixel group is coupled to the positive input terminal of the cluster differential ADC, and the second pixel group is coupled to the negative input terminal of the cluster differential ADC, and
the cluster differential ADC uses an intensity difference of reflective lights received from an object between the pixels at corresponding positions of the first pixel group and the second pixel group to determine whether the object is moving.

11. The dynamic vision sensor according to claim 10, wherein the cluster differential ADC calculates a difference between voltages of the pixels at corresponding positions and then converts the difference into a digital signal to determine whether the object is moving.

12. The dynamic vision sensor according to claim 10, wherein the cluster differential ADC converts voltages of the pixels at corresponding positions into digital signals and then calculates a difference therebetween to determine whether the object is moving.

13. The dynamic vision sensor according to claim 1, wherein in the dynamic sensing mode, the cluster differential ADC calculates a sum of accumulated electric charges of reflective lights received from an object by each pixel in the same pixel group to obtain a total intensity of reflective lights of the pixel group and calculates a difference between the total intensity of reflective lights of two consecutive frames to determine whether the object is moving.

14. The dynamic vision sensor according to claim 1, wherein:
in the dynamic sensing mode, the pixels form a pixel sequence with the order of up to bottom and left to right, the pixel sequence includes a first pixel group and a second pixel group that are adjacent to each other, the first pixel group is coupled to the positive input terminal of the cluster differential ADC, and the second pixel group is coupled to the negative input terminal of the cluster differential ADC, and
the cluster differential ADC calculates sums of accumulated electric charges of reflective lights received from an object by each pixel in the first pixel group and the second pixel group to obtain total intensities of reflective lights of the first pixel group and the second pixel group and calculates the difference between the total intensities of reflective lights of the first pixel group and the second pixel group to determine whether the object is moving.

15. The dynamic vision sensor according to claim 1, wherein if the movement of the object matches a switching condition of sensing modes, the controller controls the pixel driver, the cluster differential ADC, the cluster memory and the sensor data interface to switch between the dynamic sensing mode and the 2D image sensing mode.

16. The dynamic vision sensor according to claim 15, wherein the switching condition of sensing modes is determined by the number of pixels with reflective light intensity changes, a moving speed of the object, a moving direction of the object, a size of the object or any combination thereof.

* * * * *